(12) United States Patent
Hayafuji et al.

(10) Patent No.: US 9,287,918 B2
(45) Date of Patent: Mar. 15, 2016

(54) HIGH-FREQUENCY FRONT-END CIRCUIT (71) Applicant: Murata Manufacturing Co., Ltd., Nagaokakyo-shi, Kyoto-fu (JP)

(72) Inventors: Hisao Hayafuji, Nagaokakyo (JP); Shinya Mizoguchi, Nagaokakyo (JP); Hidenori Obiya, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/050,406

(22) Filed: Oct. 10, 2013

(65) Prior Publication Data
US 2014/0038531 A1 Feb. 6, 2014

Related U.S. Application Data (63) Continuation of application No. PCT/JP2012/055182, filed on Mar. 1, 2012.

(30) Foreign Application Priority Data

Apr. 14, 2011 (JP) .................................. 2011-089749

(51) Int. Cl.
*H04B 1/40* (2015.01)
*H04B 1/00* (2006.01)
(52) U.S. Cl.
CPC ............... *H04B 1/40* (2013.01); *H04B 1/0057* (2013.01)
(58) Field of Classification Search
CPC ........ H04B 1/0057; H04B 1/40; H04B 1/005; H04B 1/525

USPC ............ 455/73, 77, 78, 82, 83, 91, 107, 120, 455/168.1, 248.1, 280, 306, 307
See application file for complete search history.

(56) References Cited

U.S. PATENT DOCUMENTS 5,486,797 A 1/1996 Suzuki
6,085,071 A 7/2000 Yamada et al.
(Continued)

FOREIGN PATENT DOCUMENTS

JP 08-51381 A 2/1996
JP 08-316873 A 11/1996
(Continued)

OTHER PUBLICATIONS

Official Communication issued in International Patent Application No. PCT/JP2012/055182, mailed on Apr. 17, 2012.

*Primary Examiner* — Tuan Pham
(74) *Attorney, Agent, or Firm* — Keating & Bennett, LLP (57) ABSTRACT A high-frequency front-end circuit includes a first variable filter and a second variable filter. One end of each of the variable filters is connected to a common terminal. The other end of the first variable filter is connected to a transmission individual terminal and the other end of the second variable filter is connected to a reception individual terminal. At the time of transmission of a transmission signal, the impedance of the second variable filter is adjusted such that the impedance seen on the second variable filter side from a connection point between the variable filters is open. At the time of transmission of a reception signal, the impedance of the first variable filter is adjusted such that the impedance seen on the first variable filter side from a connection point between the variable filters is open.

11 Claims, 4 Drawing Sheets (56) References Cited

U.S. PATENT DOCUMENTS

| | | |
|---|---|---|
| 6,111,482 A | 8/2000 | Atokawa |
| 2004/0127178 A1* | 7/2004 | Kuffner ............ 455/133 |
| 2004/0266378 A1 | 12/2004 | Fukamachi et al. |
| 2010/0156554 A1* | 6/2010 | Nakamura et al. ........ 333/133 |

FOREIGN PATENT DOCUMENTS

| | | |
|---|---|---|
| JP | 11-46102 A | 2/1999 |
| JP | 11-243304 A | 9/1999 |
| JP | 2002-208802 A | 7/2002 |
| JP | 2003-133989 A | 5/2003 |

* cited by examiner

HIGH-FREQUENCY FRONT-END CIRCUIT

BACKGROUND OF THE INVENTION

1. Field of the Invention

The present invention relates to high-frequency front-end circuits that transmit and receive a plurality of communication signals having different communication schemes.

2. Description of the Related Art

Figure 1:
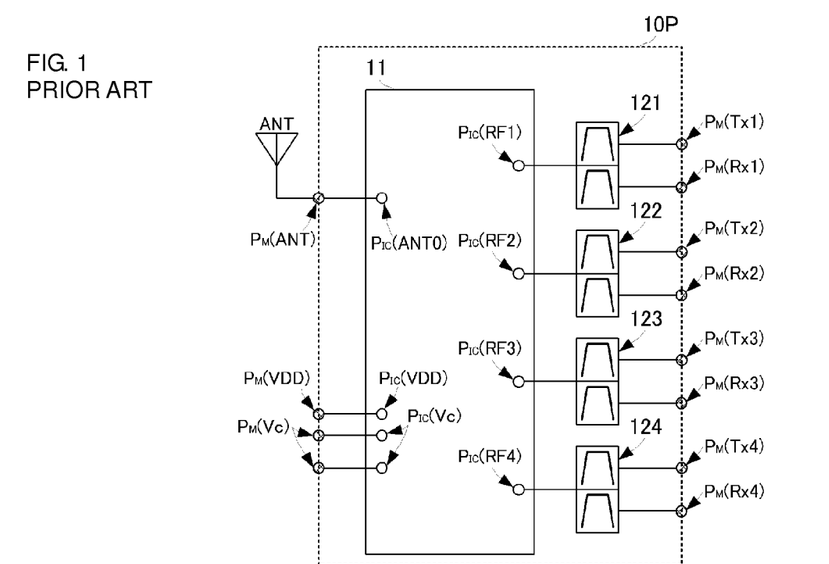
FIG. 1 is a circuit configuration diagram of a typical high-frequency front-end circuit 10P of the related art.

To date, various high-frequency front-end circuits for transmitting and receiving a plurality of communication signals utilizing different frequency bands with a common antenna have been devised. FIG. 1 is a circuit configuration diagram of a typical high-frequency front-end circuit 10P of the related art. The high-frequency front-end circuit illustrated in FIG. 1 illustrates an example in which four different types of communication signals are transmitted and received using a common antenna.

The high-frequency front-end circuit 10P of the related art includes a switch device 11 and SAW duplexers 121, 122, 123 and 124. The switch device 11 has a common terminal $P_{IC}$(ANT0) and individual terminals $P_{IC}$(RF1) to (RF4). The switch device 11 is initiated by a driving voltage input from a driving power supply terminal $P_{IC}$(VDD) and connects any one of the individual terminals $P_{IC}$(RF1) to (RF4) to the common terminal $P_{IC}$(ANT0) in accordance with a control signal input from any of a plurality of control signal input terminals $P_{IC}$(Vc). A common antenna ANT is connected to the common terminal $P_{IC}$(ANT0).

The SAW duplexer 121 is connected to the individual terminal $P_{IC}$(RF1). A transmission filter of the SAW duplexer 121 is connected to a first transmission signal input terminal $P_M$(Tx1). A reception filter of the SAW duplexer 121 is connected to a first reception signal output terminal $P_M$(Rx1).

The SAW duplexer 122 is connected to the individual terminal $P_{IC}$(RF2). A transmission filter of the SAW duplexer 122 is connected to a second transmission signal input terminal $P_M$(Tx2). A reception filter of the SAW duplexer 122 is connected to a second reception signal output terminal $P_M$(Rx2).

The SAW duplexer 123 is connected to the individual terminal $P_{IC}$(RF3). A transmission filter of the SAW duplexer 123 is connected to a second transmission signal input terminal $P_M$(Tx3). A reception filter of the SAW duplexer 123 is connected to a second reception signal output terminal $P_M$(Rx3).

The SAW duplexer 124 is connected to the individual terminal $P_{IC}$(RF4). A transmission filter of the SAW duplexer 124 is connected to a fourth transmission signal input terminal $P_M$(Tx4). A reception filter of the SAW duplexer 124 is connected to a fourth reception signal output terminal $P_M$(Rx4).

With such a configuration, the high-frequency front-end circuit of the related art transmits a transmission signal from each of the transmission signal input terminals from the common antenna ANT and outputs a reception signal received by the common antenna ANT from a desired reception signal output terminal.

Incidentally, currently, as examples of wireless communication schemes for cellular phones, in the third generation partnership project (3GPP) standards of third generation (3G) cellular phones, such as the wide band code division multiple access (W-CDMA) standard and the third generation project third generation 2 (3GPP2) standard, CDMA 2000 (wide band cdma one) is a frequency division duplex (FDD) scheme and global system for mobile communications (GSM) of the 3GPP standard, time division long term evolution (TD-LTE) and time division synchronous code division multiple access (TD-SCDMA) are time division duplex (TDD) schemes.

Therefore, a high-frequency front-end circuit that can handle communication signals of both the FDD scheme and the TDD scheme is needed and a high-frequency front-end circuit that transmits and receives FDD-scheme communication signals and TDD-scheme communication signals using a common antenna is described in Japanese Unexamined Patent Application Publication No. 8-316873 as an example of such a high-frequency front-end circuit.

The high-frequency front-end circuit described in Japanese Unexamined Patent Application Publication No. 8-316873 has one port that is used for FDD-scheme communication signals and two ports that are used for TDD-scheme communication signals as illustrated in FIG. 3 of Japanese Unexamined Patent Application Publication No. 8-316873 and the ports are switched between.

However, as has been described above, in the high-frequency front-end circuit of the related art, a multiple-branch switch device is used and a number of duplexers equal to the number of types of transmission and reception signals is needed in order to handle a plurality of communication signals (transmission and reception signals). Consequently, the scale of the circuit may be increased and it may be difficult to reduce the cost.

In addition, in the high-frequency front-end circuit of the related art described in Japanese Unexamined Patent Application Publication No. 8-316873, a path for a TDD-scheme communication signal and a path for an FDD-scheme communication signal need to be individually provided and the scale of the circuit is increased. In addition, since the transmission frequency band and the reception frequency band overlap for a TDD-scheme communication signal, in the high-frequency front-end circuit of the related art, it is not possible to use a duplexer that can be used for an FDD-scheme communication signal and therefore a switch device is necessary and as a result the circuit scale is increased and cost reduction is difficult also due to this point.

SUMMARY OF THE INVENTION

Therefore, preferred embodiments of the present invention provide a high-frequency front-end circuit that, despite having a simple circuit configuration, is capable of transmitting and receiving both FDD-scheme communication signals and TDD-scheme communication signals using a common antenna without degradation of communication characteristics.

A high-frequency front-end circuit according to a preferred embodiment of the present invention includes first and second variable filters, a common terminal, a first individual terminal and a second individual terminal. The first and second variable filters are each configured such that a transmission characteristic and an impedance characteristic thereof are adjustable. The common terminal is connected to the first variable filter and the second variable filter. The first individual terminal is connected to a side of the first variable filter opposite to the side to which the common terminal is connected. The second individual terminal is connected to a side of the second variable filter opposite to the side to which the common terminal is connected. With this configuration, when a first high-frequency signal that uses a first frequency band is to be transmitted, a pass band of the first variable filter is adjusted to the first frequency band and an impedance of the second variable filter is adjusted such that the impedance of the second variable filter in the first frequency band seen from the common terminal side is open. In contrast, when a second high-frequency signal that uses a second frequency band is to be transmitted, a pass band of the second variable filter is adjusted to the second frequency band and an impedance of the first variable filter is adjusted such that the impedance of the first variable filter in the second frequency band seen from the common terminal side is open.

With this configuration, in a case where the first high-frequency signal is to be transmitted, when, for example, the first high-frequency signal is input from the first individual terminal and output from the common terminal, unnecessary components of the first high-frequency signal are attenuated by the first variable filter and the first high-frequency signal is then output from the common terminal. At this time, the impedance of the second variable filter to the frequencies of the first high-frequency signal is open and therefore the first high-frequency signal is prevented from leaking to the second variable filter from the first variable filter. On the other hand, in a case where the second high-frequency signal is to be transmitted, when for example the second high-frequency signal is input from the common terminal and output from the second individual terminal, unnecessary components of the second high-frequency signal are attenuated by the second variable filter and the second high-frequency signal is then output from the second individual terminal. At this time, the impedance of the first variable filter to the frequencies of the second high-frequency signal is open and therefore the second high-frequency signal is prevented from leaking to the first variable filter from the common terminal. That is, isolation of the first variable filter and the second variable filter is ensured and signal loss in the pass band is significantly reduced or prevented.

In addition, in the high-frequency front-end circuit according to a preferred embodiment of the present invention, it is preferable that the first variable filter be a transmission filter for specific communication signals, and the second variable filter be a reception filter for the specific communication signals, and the common terminal be a terminal for connection to an external common antenna.

With this configuration, isolation of a reception circuit and a transmission circuit for a specific communication signal can be ensured.

In addition, it is preferable that the high-frequency front-end circuit according to a preferred embodiment of the present invention be used for communication signals of a time division scheme where the frequencies of the first high-frequency signal and the frequencies of the second high-frequency signal at least partially overlap.

With this configuration, a case has been illustrated where the frequency bands in which the configuration according to a preferred embodiment of the present invention is effectively used overlap, and in this case isolation cannot be secured by just changing settings of the filter characteristics, but isolation is secured by adjusting the impedance as described above.

In addition, it is preferable that the high-frequency front-end circuit according to a preferred embodiment of the present invention include a plurality of duplexers, each including a set of the transmission filter and the reception filter, that common terminals of the duplexers be connected to each other, and that variable filters that define duplexers other than a duplexer that allows the specific communication signals to pass therethrough be adjusted such that their impedances become open with respect to the specific communication signals or such that their pass bands become attenuated bands for the specific communication signals.

With this configuration, not just transmission and reception of a transmission signal and a reception signal of communication signals of one type, but rather transmission and reception of a plurality of types of communication signals is performed with a common antenna while securing isolation of transmission and reception circuits from each other.

In addition, it is preferable that, in the high-frequency front-end circuit according to a preferred embodiment of the present invention, the first variable filter and the second variable filter each include a control input terminal.

With this configuration, an example of specific configuration is illustrated in which the frequency characteristic and the impedance characteristic of each of the variable filters are adjusted using a control signal.

According to various preferred embodiments of the present invention, despite using a simple circuit configuration, transmission and reception of a plurality of communication signals including FDD-scheme communication signals or TDD-scheme communication signals are performed using a common antenna without degradation of communication characteristics.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A high-frequency front-end circuit according to a first preferred embodiment of the present invention will be described with reference to the drawings. FIG. 1 is a circuit configuration diagram of a high-frequency front-end circuit 10 according to this preferred embodiment.

Figure 2:
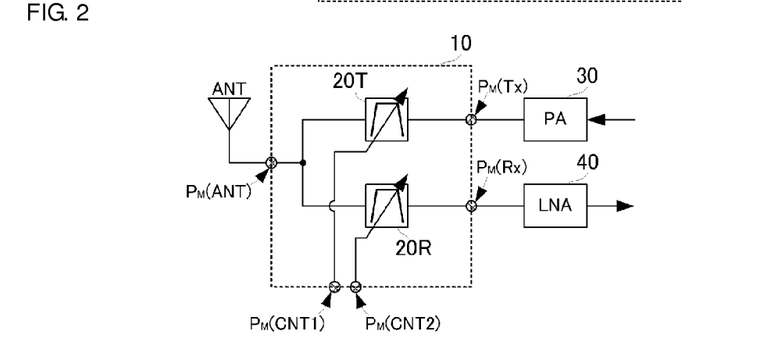
FIG. 2 is a circuit configuration diagram of a high-frequency front-end circuit 10 according to a first preferred embodiment of the present invention.

The high-frequency front-end circuit 10 includes variable filters 20T and 20R. The variable filter 20T corresponds to a first variable filter and the variable filter 20R corresponds to a second variable filter. In this preferred embodiment, a case is illustrated in which the variable filter 20T serves as a transmission filter and the variable filter 20R serves as a reception filter for specific communication signals (transmission signal and reception signal). Therefore, a variable duplexer includes the variable filter 20T and the variable filter 20R.

The variable filters 20T and 20R are each configured such that the pass frequency band and the attenuated frequency band thereof are adjustable. In addition, the variable filters 20T and 20R are each configured such that an impedance characteristic thereof are adjustable. For example, in a case where each of the variable filters 20T and 20R includes an LC circuit including an inductor and a capacitor, a variable inductor is included and has an inductance that is adjusted to that of the portion of the inductor being used and a variable capacitor is included and has a capacitance that is adjusted to that of the portion of the capacitor being used. In addition, the variable filters 20T and 20R may each include a micro-electromechanical systems (MEMS) mechanism and may be physically (mechanically) switched between an open state (impedance corresponds to open state) and a conductive state.

A control signal input terminal $P_M(CNT1)$ is connected to the variable filter 20T. The frequency characteristic and the impedance characteristic of the variable filter 20T can be adjusted using a first control signal input from the control signal input terminal $P_M(CNT1)$.

A control signal input terminal $P_M(CNT2)$ is connected to the variable filter 20R. The frequency characteristic and impedance characteristic of the variable filter 20R can be adjusted using a second control signal input from the control signal input terminal $P_M(CNT2)$.

One end of each of the variable filters 20T and 20R is connected to a common terminal $P_M(ANT)$. A common antenna ANT is connected to the common terminal $P_M(ANT)$. The common antenna ANT transmits and receives specific communication signals to the outside.

The other end of the variable filter 20T is connected to a transmission individual terminal $P_M(Tx)$. The transmission individual terminal $P_M(Tx)$ is connected to a power amplifier (PA) 30. The power amplifier 30 performs amplification processing on a transmission signal among the specific communication signals and inputs the amplified transmission signal to the transmission individual terminal $P_M(Tx)$.

The other end of the variable filter 20R is connected to a reception individual terminal $P_M(Rx)$. The reception individual terminal $P_M(Rx)$ is connected to a low noise amplifier (LNA) 40. The low noise amplifier 40 performs amplification processing on a reception signal from the reception individual terminal $P_M(Rx)$ among the specific communication signals.

The thus-structured high-frequency front-end circuit 10 transmits and receives the specific communication signals via the following operations.

Figure 3:
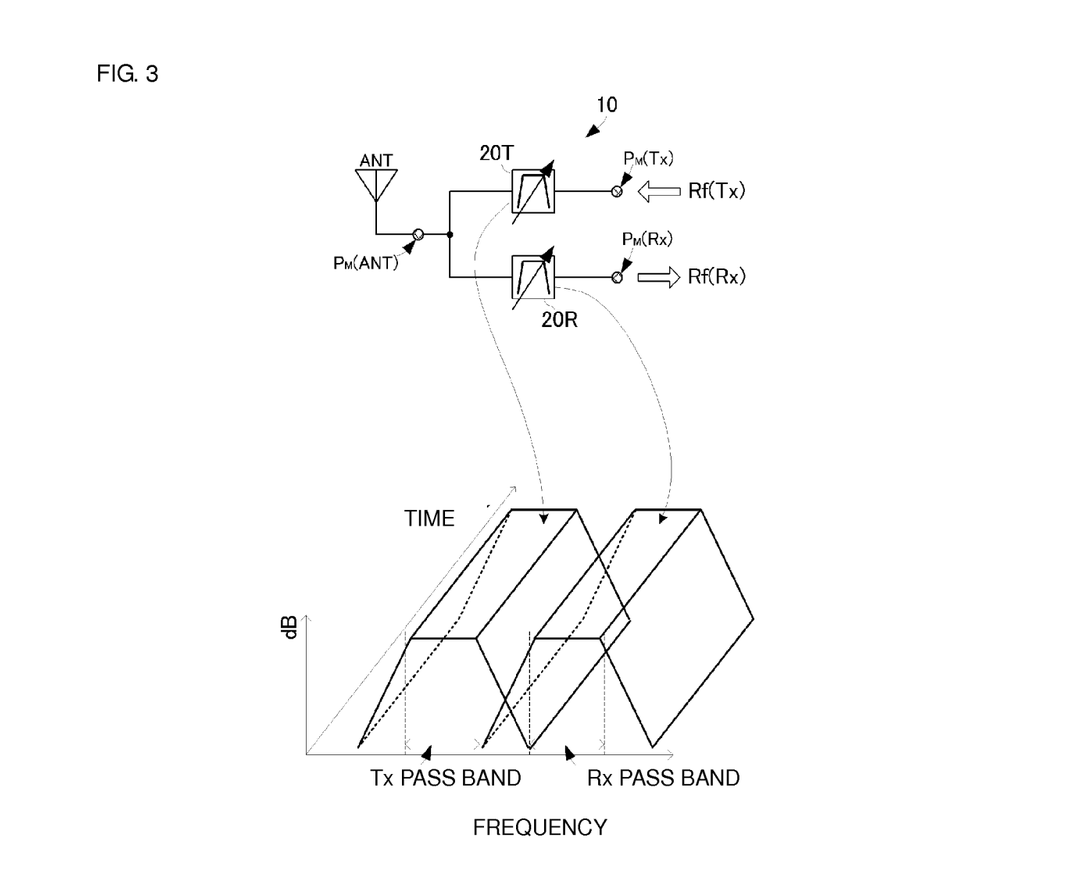
FIG. 3 illustrates the concept of filter settings at the time of transmission and reception of FDD-scheme communication signals.

(1) Case of Transmission and Reception of Frequency Division Duplex (FDD) Communication Signals as Specific Communication Signals FIG. 3 illustrates the concept of filter settings at the time of transmission and reception of FDD-scheme communication signals.

In the case where FDD-scheme communication signals, which have different transmission and reception frequencies, are to be transmitted and received, the band characteristic of the variable filter 20T is set by the first control signal such that the transmission frequency band falls within the pass band of the variable filter 20T and that the reception frequency band falls within the attenuated band of the variable filter 20T. In addition, the band characteristic of the variable filter 20R is set such that the reception frequency band falls within the pass band of the variable filter 20R and that the transmission frequency band falls within the attenuated band of the variable filter 20R. These band settings of the variable filters 20T and 20R are maintained independent of time during transmission and reception of FDD-scheme communication signals. In the case of W-CDMA where communication is performed with the FDD scheme, the pass band of the variable filter 20T is adjusted to be, for example, 1920 MHz to 1980 MHz and the pass band of the variable filter 20R is adjusted to be, for example, 2110 MHz to 2170 MHz.

With this configuration, unnecessary components of a transmission signal input from the transmission individual terminal $P_M(Tx)$ are subjected to filter processing by the variable filter 20T and the transmission signal is then output from the common antenna ANT via the common terminal $P_M(ANT)$. At this time, on the reception circuit side, the transmission signal is attenuated by the variable filter 20R and not transmitted to the reception individual terminal $P_M(Rx)$.

On the other hand, unnecessary components of a reception signal, which has been received by the common antenna ANT and input from the common terminal $P_M(ANT)$, are subjected to filter processing by the variable filter 20R and the reception signal is then output from the reception individual terminal $P_M(Rx)$. At this time, on the transmission circuit side, the reception signal is attenuated by the variable filter 20T and not transmitted to the transmission individual terminal $P_M(Tx)$.

Thus, with the configuration of this preferred embodiment, FDD-scheme communication signals, for which the transmission and reception frequency bands are different, can be transmitted and received using a single common antenna.

Figure 4:
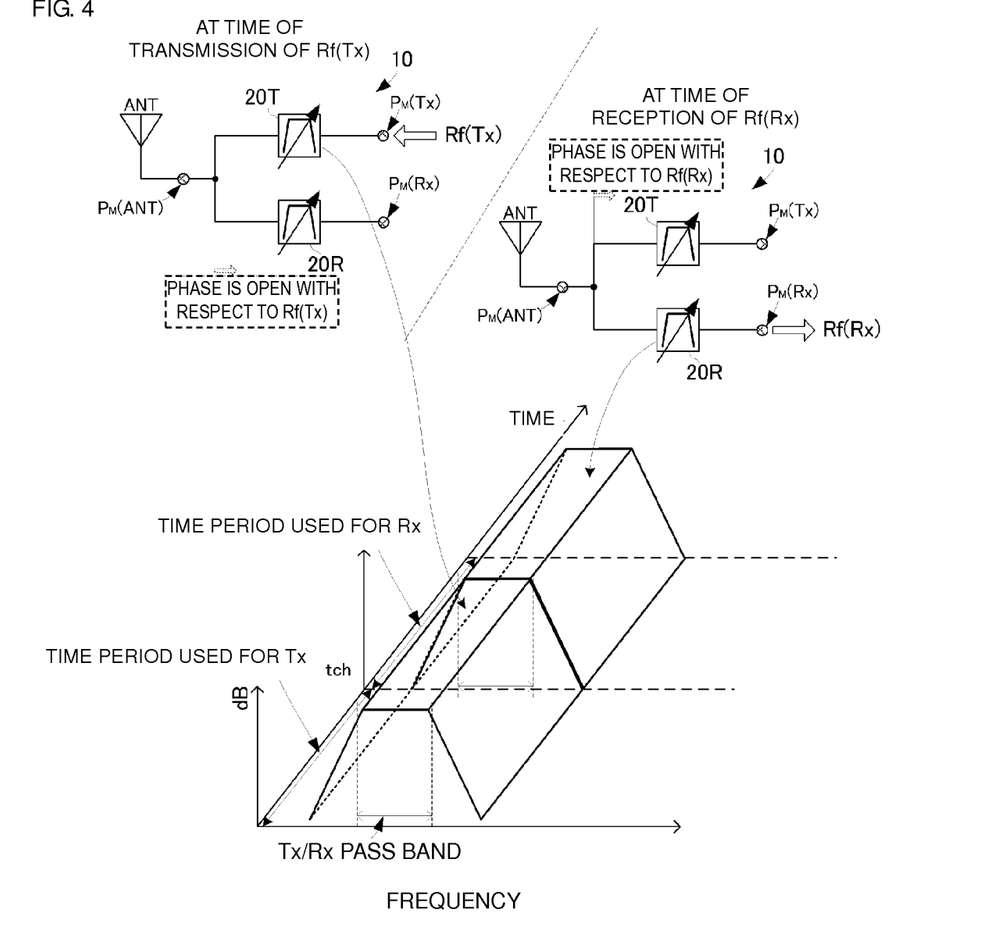
FIG. 4 illustrates the concept of filter settings at the time of transmission and reception of TDD-scheme communication signals.

(2) Case of Transmission and Reception of TDD-Scheme Communication Signals as Specific Communication Signals FIG. 4 illustrates the concept of filter settings at the time of transmission and reception of TDD-scheme communication signals. In FIG. 4, a case is illustrated in which the transmission frequency band and the reception frequency band completely coincide with each other, but a case in which the frequency bands only partially overlap can also be considered.

In addition, in the following description, as fixed settings, at the time of transmission, both the variable filter 20T and the variable filter 20R are set such that the transmission/reception frequency band of communication signals fall inside their pass bands.

(2-1) Transmission Period

The variable filter 20T that transmits a TDD-scheme communication signal is set such that the pass band of the variable filter 20T matches the transmission frequency band during the transmission period (period up to the time tch in FIG. 4). For example, in the case of TD-LTE where communication is performed with the TDD scheme, the pass band of the variable filter 20T is set to, for example, 1900 MHz to 1920 MHz. On the other hand, the impedance of the variable filter 20R during the transmission period is set such that the impedance in the transmission/reception frequency band seen on the variable filter 20R side from the connection point between the variable filters 20T and 20R is open.

The impedance of the variable filter 20R is set in this way, such that unnecessary components of a transmission signal input from the transmission individual terminal $P_M(Tx)$ are subjected to filter processing by the variable filter 20T and the transmission signal is then transmitted from the common antenna ANT via the common terminal $P_M(ANT)$. At this time, the impedance on the reception circuit side is set to be open with respect to the transmission signal and therefore the transmission signal is not transmitted to the variable filter 20R and the reception individual terminal $P_M(Rx)$.

(2-2) Reception Period

On the other hand, setting is performed such that the pass band of the variable filter 20R matches the reception frequency band during the reception period (period after time tch in FIG. 4). For example, in the case of TD-LTE where communication is performed with the TDD scheme, the pass band of the variable filter 20R is set to, for example, 1900 MHz to 1920 MHz. On the other hand, the impedance of the variable filter 20T is set such that the impedance in the transmission/reception frequency band seen on the variable filter 20T side from the connection point between the variable filters 20T and 20R is open.

The impedance of the variable filter 20T is set in this way, such that the unnecessary components of a reception signal that has been received by the common antenna ANT and input from the common terminal $P_M$(ANT) are subjected to filter processing by the variable filter 20R and the reception signal is then output from the reception individual terminal $P_M$(Rx). At this time, the impedance on the transmission circuit side is set so as to be open with respect to the reception signal and therefore the reception signal is not transmitted to the variable filter 20T and the transmission individual terminal $P_M$(Tx).

Thus, if the configuration of this preferred embodiment is used, TDD-scheme communication signals can be transmitted and received using a single common antenna.

Thus, if the configuration of this preferred embodiment is used, transmission and reception can be performed using a high-frequency front-end circuit that uses a common antenna and has a simple configuration even for communication signals of an FDD scheme and a TDD scheme.

In the above description, a case in which FDD-scheme communication signals are transmitted and received and a case in which TDD-scheme communication signals are transmitted and received were separately described. However, for example, as fixed settings, when the pass bands of the variable filters 20T and 20R have been set to the above-mentioned TDD transmission/reception frequency band and control is input in order to transmit and receive FDD-scheme communication signals, setting can be performed such that the pass band of the variable filter 20T is changed to the transmission frequency band of an FDD-scheme communication signal and that the pass band of the variable filter 20R is changed to the reception frequency band of an FDD-scheme communication signal. Thus, transmission and reception of FDD-scheme communication signals and TDD-scheme communication signals can be performed using a common high-frequency front-end circuit. In addition, TDD-scheme communication signals can be subjected to transmission and reception processing without use of a switch device.

Figure 5:
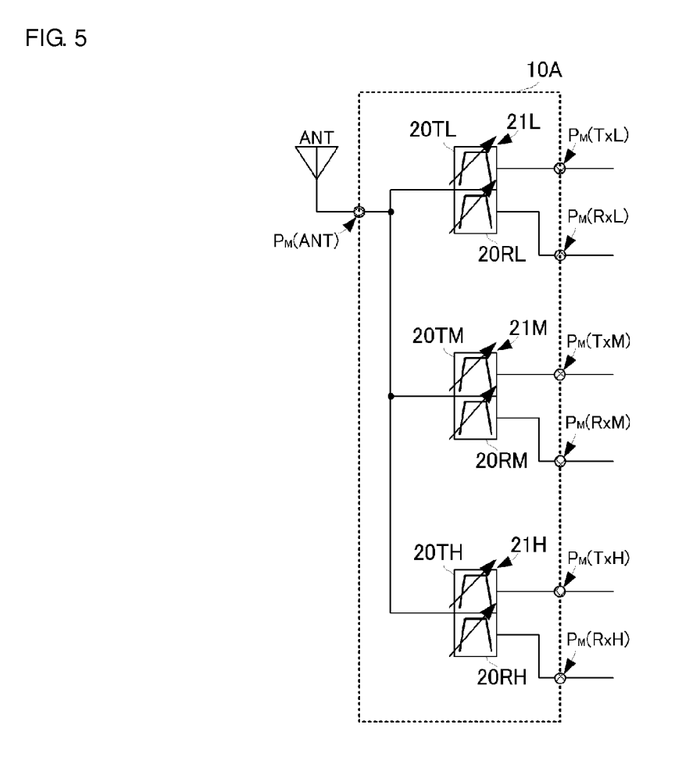
FIG. 5 is a circuit configuration diagram of a high-frequency front-end circuit 10 according to a second preferred embodiment of the present invention.

Next, a high-frequency front-end circuit according to a second preferred embodiment will be described with reference to the drawings. FIG. 5 is a circuit configuration diagram of a high-frequency front-end circuit 10A according to this preferred embodiment.

In the above-described first preferred embodiment, a case was described in which a set including a transmission filter and a reception filter is provided, whereas in this preferred embodiment a plurality of sets including a transmission filter and a reception filter are provided.

The high-frequency front-end circuit 10A includes variable duplexers 21L, 21M and 21H. These variable duplexers 21L, 21M and 21H have different ranges within which their pass bands can be set. For example, the frequency bands of all the communication signals used by the high-frequency front-end circuit 10A are set to a low band, a middle band and a high band, using the magnitude of frequency as a criterion. The variable duplexer 21L is set for low band use, the variable duplexer 21M is set for middle band use and the variable duplexer 21H is set for high band use.

The variable duplexer 21L includes variable filters 20TL and 20RL. A common terminal of the variable duplexer 21L is connected to a common terminal $P_M$(ANT) of the high-frequency front-end circuit 10A. A variable filter 20TL-side individual terminal of the variable duplexer 21L is connected to a first transmission side individual terminal $P_M$(TxL) of the high-frequency front-end circuit 10A. A variable filter 20RL-side individual terminal of the variable duplexer 21L is connected to a first reception side individual terminal $P_M$(RxL) of the high-frequency front-end circuit 10A.

The variable duplexer 21M includes variable filters 20TM and 20RM. A common terminal of the variable duplexer 21M is connected to the common terminal $P_M$(ANT) of the high-frequency front-end circuit 10A. A variable filter 20TM-side individual terminal of the variable duplexer 21M is connected to a second transmission side individual terminal $P_M$(TxM) of the high-frequency front-end circuit 10A. A variable filter 20RM-side individual terminal of the variable duplexer 21M is connected to a second reception side individual terminal $P_M$(RxM) of the high-frequency front-end circuit 10A.

The variable duplexer 21H includes variable filters 20TH and 20RH. A common terminal of the variable duplexer 21H is connected to the common terminal $P_M$(ANT) of the high-frequency front-end circuit 10A. A variable filter 20TH-side individual terminal of the variable duplexer 21H is connected to a third transmission side individual terminal $P_M$(TxH) of the high-frequency front-end circuit 10A. A variable filter 20RH-side individual terminal of the variable duplexer 21H is connected to a third reception side individual terminal $P_M$(RxH) of the high-frequency front-end circuit 10A.

In this configuration, for example, when a TDD-scheme transmission signal is input from the first transmission individual terminal $P_M$(TxL), the impedance of the variable filter 20RL is set such that the impedance in the transmission/reception frequency band seen on the variable filter 20RL side from the connection point between the variable filters 20TL and 20RL (that is, from the common terminal of the duplexer 21L) is open.

In addition, so long as the pass bands of the filters of the variable duplexers 21M and 21H do not coincide with the band of a transmission signal input to the first transmission side individual terminal $P_M$(TxL), their transmission characteristics remain the same. Here, when there are cases where the pass bands of the filters partially overlap the band of a transmission signal input to the first transmission side individual terminal $P_M$(TxL), the impedances seen on the variable duplexers 21M and 21H side (in particular, the variable duplexer 21M side close to the use frequency) are set to be open. Of course, even if the pass bands of the filters do not coincide with the band of a transmission signal input to the first reception side individual terminal $P_M$(RxL), the impedances may be set to open.

Thus, even with a configuration in which a plurality of duplexers (each being a set including a transmission filter and a reception filter) are used, transmission and reception of a plurality of communication signals can be performed using a common antenna ANT while ensuring isolation of the individual terminals from each other. In addition, by adopting the configuration of this preferred embodiment, since the frequency range within which processing can be performed is widened, it becomes possible to provide a front-end circuit that can handle a greater number of frequency bands.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency front-end circuit, comprising:
  first and second variable filters each including an adjustable transmission characteristic and an adjustable impedance characteristic;
  a common terminal to which the first variable filter and the second variable filter are connected;
  a first individual terminal that is connected to a side of the first variable filter opposite to a side to which the common terminal is connected; and a second individual terminal that is connected to a side of the second variable filter opposite to the side to which the common terminal is connected; wherein at a time when frequency division duplex communication signals are to be transmitted and received, a band characteristic of the first variable filter is set such that a transmission frequency band falls within a pass band of the first variable filter and a reception frequency band falls within an attenuated band of the first variable filter, and a band characteristic of the second variable filter is set such that the reception frequency band falls within a pass band of the second variable filter and the transmission frequency band falls within an attenuated band of the second variable filter;

at a time when time division duplex communication signals are to be transmitted, the pass band of the first variable filter is adjusted to match a transmission frequency band and an impedance of the second variable filter is adjusted such that the impedance of the second variable filter in the transmission frequency band seen from the common terminal side is open; and at a time when the time division duplex communication signals are to be received, the pass band of the second variable filter is adjusted to match a reception frequency band and an impedance of the first variable filter is adjusted such that the impedance of the first variable filter in the second frequency band seen from the common terminal side is open.

2. The high-frequency front-end circuit according to claim 1, further comprising:
a plurality of duplexers each including a set of the transmission filter and the reception filter; wherein
common terminals of the duplexers are connected to each other; and
variable filters that define duplexers other than a duplexer that will allow the specific communication signals to pass therethrough are adjusted such that impedances thereof with respect to the specific communication signals become open or such that pass bands thereof become attenuated bands for the specific communication signals.

3. The high-frequency front-end circuit according to claim 1, wherein the first variable filter and the second variable filter each include a control input terminal.

4. The high-frequency front-end circuit according to claim 1, wherein each of the first and second variable filters includes an LC circuit including an inductor and a capacitor.

5. The high-frequency front-end circuit according to claim 4, wherein the inductor is a variable inductor.

6. The high-frequency front-end circuit according to claim 1, further comprising a micro-electromechanical system mechanism arranged to switch the circuit between an open state and a conductive state.

7. The high-frequency front-end circuit according to claim 2, wherein the plurality of duplexers have different ranges within which pass bands thereof are located.

8. The high-frequency front-end circuit according to claim 2, wherein
the first variable filter is a transmission filter for specific communication signals;
the second variable filter is a reception filter for the specific communication signals; and
the common terminal is a terminal arranged to be connected to an external common antenna.

9. The high-frequency front-end circuit according to claim 8, wherein each of the first and second variable filters includes an LC circuit including an inductor and a capacitor.

10. The high-frequency front-end circuit according to claim 9, wherein the inductor is a variable inductor.

11. The high-frequency front-end circuit according to claim 2, further comprising a micro-electromechanical system mechanism arranged to switch the circuit between an open state and a conductive state.

* * * * *